United States Patent [19]

Hayashi

[11] 4,339,860
[45] Jul. 20, 1982

[54] METHOD OF PRODUCING CHANNEL-SHAPED TRIM

[75] Inventor: Keizo Hayashi, Nagoya, Japan

[73] Assignee: Toyoda Gosei Co., Ltd., Nagoya, Japan

[21] Appl. No.: 53,551

[22] Filed: Jun. 29, 1979

[30] Foreign Application Priority Data

Jun. 30, 1978 [JP] Japan ................................ 53-91206[U]

[51] Int. Cl.³ ............................................. B23P 17/00
[52] U.S. Cl. ..................................... 29/413; 29/527.2; 72/46
[58] Field of Search .................. 29/156.6, 156.63, 413, 29/527.2; 72/46; 49/440, 441, 490, 491; 428/31, 122, 164, 188, 192

[56] References Cited

U.S. PATENT DOCUMENTS

| | | | |
|---|---|---|---|
| 3,165,793 | 1/1965 | Lynch | 49/491 X |
| 3,241,219 | 3/1966 | Hamm | 29/413 X |
| 3,550,246 | 12/1970 | Zoller | 29/413 |
| 3,699,718 | 10/1972 | Kimura | 49/491 |
| 4,188,424 | 2/1980 | Ohno et al. | 49/490 X |

Primary Examiner—Ervin M. Combs
Attorney, Agent, or Firm—Cushman, Darby & Cushman

[57] ABSTRACT

A channel-shaped trim having a longitudinally extending opening for embracing and clamping an edge flange of a support member and a method for producing such a trim.

The trim is comprised of a core member having a large number of disconnected channel-shaped core pieces and a covering member enclosing the core member and charged between the adjacent core pieces and in slots which are formed in the core pieces.

The method for producing such a trim as described above comprises the steps of slotting a band-shaped sheet metal to form a core member comprised of a large number of core pieces composed of at least two strip-shaped elements spaced from each other and connecting portions connecting two strip-shaped elements, and weakened connecting portions connecting two adjacent core pieces, covering the core member with the covering material, breaking the weakened connecting portions, and bending the covered and broken core member to produce a channel-shaped trim.

6 Claims, 10 Drawing Figures

METHOD OF PRODUCING CHANNEL-SHAPED TRIM

BACKGROUND OF THE PRESENT INVENTION

The present invention relates to a trim element used for protecting, trimming and sealing edge portions, joint portions and the like of automobiles, furniture and the like or used for attaching weather stripping or other similar articles to various types of straight or covered structures.

The present invention also relates to methods for the manufacture of such trim products.

Trim elements generally of the above described type, are known where the structure comprises a core member embedded in a main body of rubber or synthetic resin. Such a structure has been conventionally used in order to provide good shape-retentivity to composite structures formed from the core member and the outer covering.

The trim is required to be flexible and deformable in accordance with the contour of the place where the trim is to be attached. Therefore, the core member embedded in an outer structure must not obstruct the trim from readily and freely bending or twisting.

In order to satisfy the above described demands, various types of core members have been used or proposed.

One conventional core member D, the structure as shown in FIG. 1, is comprised of a large number of spaced apart strip-shaped members 1, constructed from sheet metal or a similar material. These members are integrally connected together by bridge portions 2a located in the central portions thereof in their width direction.

Another conventional core member E as shown in FIG. 2, also has a structure comprised of a large number of spaced apart strip-shaped elements 1 which are integrally connected by bridge portions 2b located adjacent both end portions thereof in their width direction.

And by covering both surfaces of such a core member, as described above, with a covering material, such as rubber or a synthetic resin, and bending it in its width direction, a channel-shaped trim can be obtained. Each of the above described core members has good shape-retentivity because of the stiffness of the strip-shaped elements 1 which enables the trim to be deformed because of the elasticity of the bridge portions 2a and 2b.

However, even if these trims are formed with narrow or thin bridge portions 2a and 2b, these conventional trims do not freely expand, contract or bend as desired, since the bridge portions 2a and 2b are made of materials having stiffness.

Another conventional core member F, as shown in FIG. 3, overcomes the above described defect of the conventional core members D and E. In the conventional trim F, a large number of transversely extending slots 31 are longitudinally perforated in a band-shaped piece 10 at predetermined narrow intervals and concave portions 4 are provided in bridge portions 2c which are formed in both side edge portions of the piece 10. The concave portions extend across bridge portions 2c from the end of slots 31 to side edges of the piece 10. Thus, piece 10 is easily broken along the concave portions 4 by applying bending stress thereto. Accordingly if core member F is covered with rubber or some type of synthetic resin, and bending stress is applied to the covered core member in a direction perpendicular to a longitudinal direction thereof so as to break the core member in the concave portions 4 and bending it in its width direction, a channel-shaped trim will result includes a large number of individual elements 11 which have been broken out of the core member and now comprise disconnected strip like pieces. The trim obtained by the above described method freely expands, contracts and bends so that the defects of the trims including the core members D and E, respectively, can be overcome.

However, when the trim including the core member F is attached to a curved structure, especially corners having a large curvature, the covering material along the curved inner surface of the trim becomes wrinkled due to the large contractile force applied thereto so that the appearance of the trim becomes undesirable.

Accordingly, an object of the present invention is to provide an improved trim which flexibly deforms in accordance with the contour of the item to which it is to be attached with desirable shape-retentivity.

Another object of the present invention is to provide an improved trim wherein a good appearance is maintained without producing wrinkles, even if the trim is attached to a curve even one having a large curvature.

Still another object of the present invention is to provide an improved trim having a stable and strong clamping force.

A further object of the present invention is to provide an improved method for easily producing an improved trim having good deformability and shape-retentivity.

DESCRIPTION OF THE DRAWINGS

Other objects and advantages of the invention will become apparent from the following description of the preferred exemplary embodiments together with reference to the accompanying drawings wherein.

DETAILED DESCRIPTION OF THE PREFERRED EXEMPLARY EMBODIMENTS

The present invention relates to a composite trim structure wherein a large number of core pieces each of which has the structure of a plurality of, preferably two or three, strip-shaped elements which are integrally connected together by bridge portions. Such core pieces are preferably made from sheet metal although other forms and/or types of metal could be used.

The trim of the present invention can be easily produced and the resulting trim structure exhibits good deformability. At the same time the present invention allows the production of a trim product where wrinkles do not occur along the inner curved surface when the trim is formed around a curved structure.

Hereinafter, the preferred exemplary embodiments of the trim and the producing method of the trim of the present invention will be explained with reference to the accompanied drawings as compared with the conventional examples.

Figure 4:
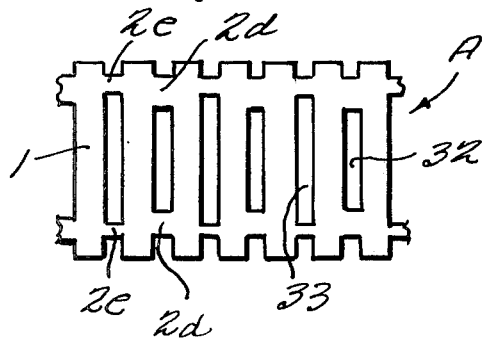
FIG. 4 is a top plan view of one embodiment of a core member constructed for use in trim made according to the present invention.
Figure 5:
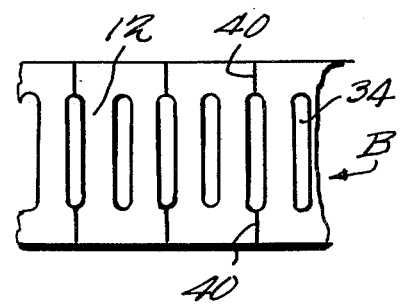
FIG. 5 is a top plan view of another embodiment of a core member constructed for use in trim made according to the present invention.

FIG. 4 and FIG. 5 respectively show two different embodiments of the core member which can be embedded with rubber or other materials to form the composite trim structure of the present invention.

In a core member A as shown in FIG. 4, a large number of strip-shaped elements 1 are longitudinally disposed at predetermined narrow intervals in series. Both side end portions thereof are connected together by bridge portions 2d and 2e. Two types of such bridge portions are shown and can either be bridge portions having a wide width (hereinafter called connecting bridge portions) 2d bridge portions having a relatively narrow width (hereinafter called weakened bridge portions) 2e which are easily broken due to bending stress. The connecting bridge portions and weakened bridge portions are alternately formed in a longitudinal direction of the core member A.

Slots 32 are formed in the core member and are defined by the connecting bridge portions 2d and two adjacent strip-shaped elements 1, while slots 33 are formed in the core member and are defined by the weakened bridge portions 2e and two adjacent strip-shaped elements 1.

The core member A having the above described structure is formed by punching a bandshaped piece of sheet metal by means of a press of conventional construction. Accordingly, any further explanation or detailed discussion thereof is not deemed essential to provide a full and complete description of the present invention.

Core member B, as shown in FIG. 5, includes transversely extending slots 34 which are formed by perforating a band-shaped piece of sheet metal 12 thereby producing elements at predetermined narrow intervals therebetween as well as connecting portions corresponding to the bridge portions of the above described core member A formed along both side edges of the band. Concave portions 40 are provided so as to extend across bridge portions and away from both ends of the every other slot 34 to both side edges of the band. Thus, the concave portions 40 cross every other bridge portion and are easily broken when bending stresses are applied to the core member B.

In the core member A, as shown in FIG. 4, the width of the weakened bridge portions 2e were formed narrow so as to be easily broken. Alternatively, the weakened bridge portions can be made thin, so that they are also easily broken.

In order to produce a trim by using each of the above described core members A and B, each of the core members is covered with the covering material such as rubber or synthetic resin by a well known extruding operation. Here again, any further explanation or detailed discussion thereof is not deemed essential to provide a full and complete description of the present invention.

Figure 6:
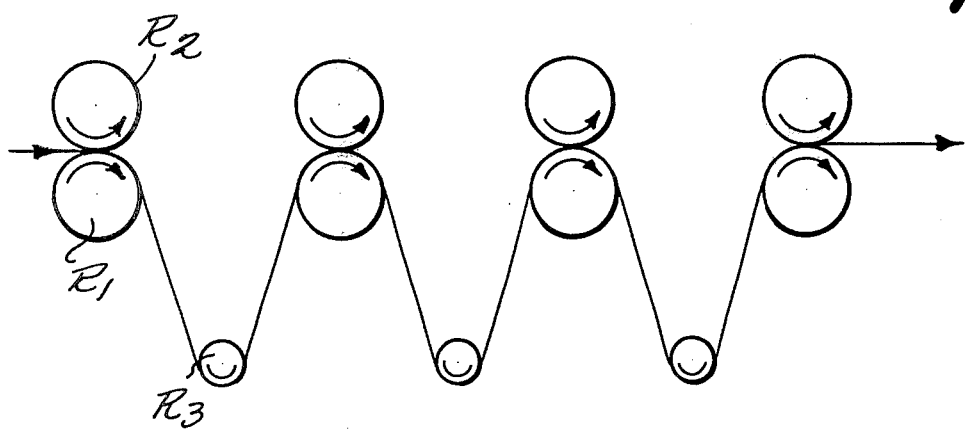
FIG. 6 is a partial side view showing apparatus used in and the step of breaking the core member embedded within the trim of the present invention.

When rubber is used as the covering material, the covered core member is also subjected to a vulcanizing operation. Following any such coating procedure the composite trim structure in which the core member is embedded is passed between rolls $R_1$ and $R_2$ and around a roll $R_3$ as shown in FIG. 6. By applying bending forces and tension forces to the trim in this manner, the core member A or B is broken in the weakened bridge portions 2e (FIG. 4) or in the concave portions 40 (FIG. 5).

Next, by bending the obtained trim including the broken core member into a desired cross sectional shape, such as a U-shape, the resulting channel-shaped trim can be easily obtained.

Figure 7:
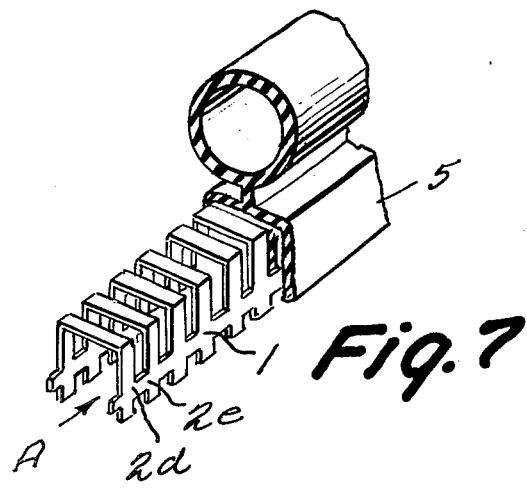
FIG. 7 is a partially cut-away perspective view of the trim wherein the core member as shown in FIG. 4 is embedded.
Figure 8:
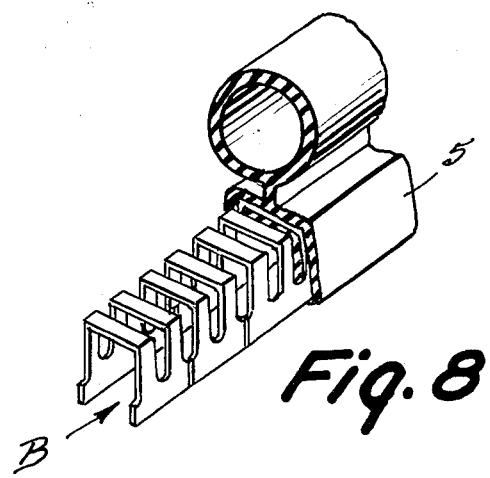
FIG. 8 is partially cut-away perspective view of the trim wherein the core member as shown in FIG. 5 is embedded.

According to the trim of the present invention the core piece, respectively composed of a pair of connected strip-shaped elements 1, become separately and longitudinally disposed in the covering material in series at predetermined intervals as shown in FIG. 7 and FIG. 8.

Figure 9:
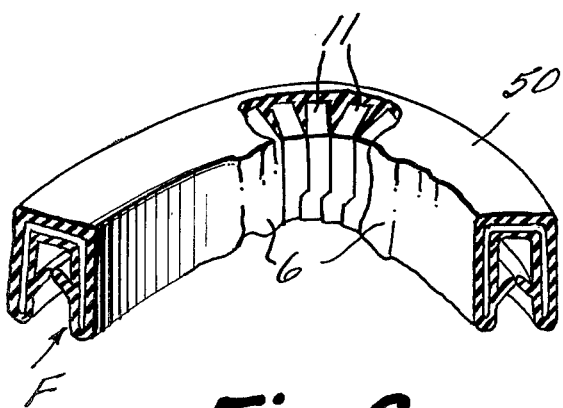
FIG. 9 is a partially cut-away perspective view showing the curved condition of the conventional trim.

Returning once again to conventional trim structures wherein the conventional core member has been embedded and broken apart, when that structure is attached to a curved portion, wrinkles as shown at 6 in FIG. 9 occur in the curved inner surface of the trim.

The high molecular material such as rubber and synthetic resin used as the covering material has the characteristic that it is easily expanded but not easily contracted. Therefore, when the trim using a high molecular material as the covering material is bent or shaped around a curve, the size difference occurred between the inner curved surface and the outer curved surface of the trim produces wrinkles in the inner curved surface of the trim.

Figure 1:
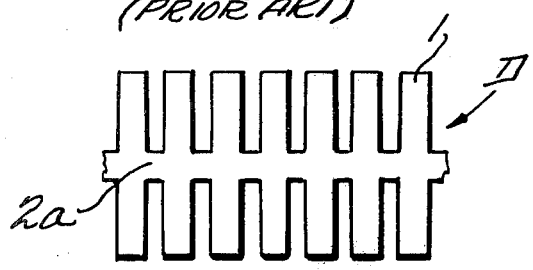
FIG. 1 to FIG. 3 are top plan views showing prior art examples of core members used in conventional trims.
Figure 2:
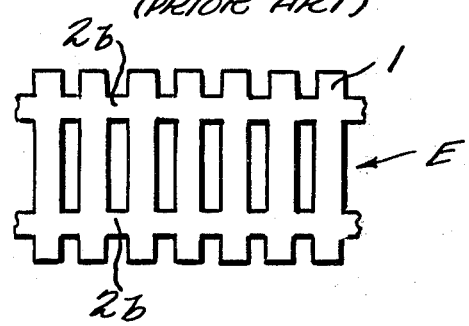
Figure 3:
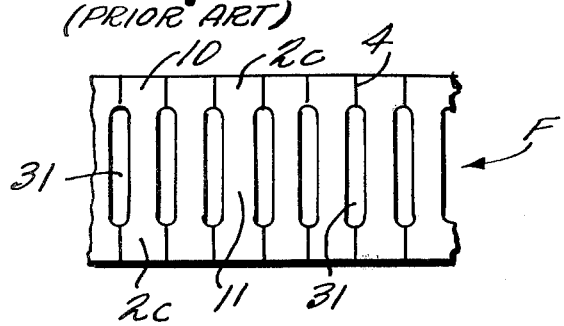

Thus, when the trim as in FIG. 9 includes the conventional core member F as shown in FIG. 3 and is curved in accordance with the contour of the item to which is attached, each of elements 11 is piled up against adjacent elements in the inner curved surface of the trim and the inner curved surface of the covering member 50 rises by each of the elements 11 causing large wrinkles 6 as shown in FIG. 9.

Figure 10:
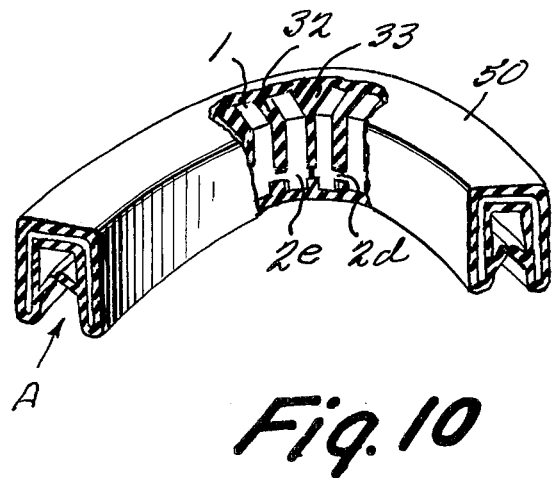
FIG. 10 is a partially cut-away perspective view showing the curved condition of the trim of the present invention.

In contrast, in the trim of the present invention using the core member A (FIG. 4), two strip-shaped elements 1 are connected with each other to form one core piece and a slot 32 is formed in the middle thereof. The covering material will have flowed into and through all openings including slots 32. Therefore, each core piece does not move relative to adjacent core pieces within the covering member 50. When the trim of the present invention including, for example, the core member A is curved, the contraction of the inner curved surface of the covering member 50 is restrained by the core pieces which have not relatively moved within the covering member 50, and the outer curved surface of the covering member 50 is largely expanded as shown in FIG. 10.

Therefore, wrinkles scarcely occur in the inner curved surface of the trim of the present invention. Consequently, a very good appearance can be obtained when the trim of the present invention is attached to a curved portion.

When the conventional trim including disconnectedly disposed elements 11 is attached to a structure or surface which has depressions and projections, the clamping force of the trim becomes unstable because each of the elements 11 separately pinches the depressed and projected surface.

In contrast, according to the trim of the present invention, the core pieces respectively composed of a pair of strip-shaped elements pinch the depressed and projected surface. Therefore, the clamping force of the trim of the present invention becomes stable and strong.

Furthermore, when the conventional trim including, for example, the core member F (FIG. 3) is bent to form U-shaped cross sectional shape, since broken elements 11 are not firmly fixed by the covering material, the bent shape of each of the elements 11 is different from each other and the arrangement of the elements 11 becomes disordered. In some cases, the element 11 may break the covering material and be exposed out of the trim.

In contrast, when the trim of the present invention including, for example, the core member A (FIG. 4), is bent, the covering material flows or extends with and through slots 32 surrounded by the strip-shaped elements and connecting bridge portions, thereby preventing the connected core pieces from slipping with respect to each other since the covering material closely adheres thereto.

Therefore, the bending stress is transmitted from the rolls to the core pieces uniformly. As a result, the U-shaped cross section of each of core pieces is uniform and the core pieces are arranged without disorder. Furthermore, the core pieces do not become exposed or come out of the trim, breaking the covering material.

The number of strip-shaped elements composing one core piece to be embedded in the trim of the present invention is determined by the width of each of the elements, the interval between adjacent elements and the curvature of the attaching portion. If the width of each of the elements and the interval between adjacent elements are made narrow, three or more elements can be connected to form one core piece. And when the curvature of the attaching portion is large, the number of strip-shaped elements composing one core piece must be small. Practically two or three strip-shaped elements are proper.

As described above, the trim of the present invention comprises a large number of core pieces respectively composed of a plurality of connected strip-shaped elements disconnectedly embedded in the trim.

The trim of the present invention can be attached to a desired structure and follow the contour thereof easily and with good success.

Further, when the trim of the present invention is attached to a curved portion, the good appearance thereof is maintained without producing wrinkles as compared with the conventional trims.

Furthermore, the trim of the present invention strongly and uniformly pinches the attaching portion. And the workability thereof is superior to that of the conventional trims.

Having now fully described the invention, it will be apparent to one of ordinary skill in the art that many changes and modifications can be made thereto without departing from the spirit or scope of the invention as set forth herein.

I claim:

1. A method for producing channel-shaped trim having a longitudinally extending opening for embracing and clamping an edge flange of a support member comprising the steps of forming a core member for said trim by slotting a band of material to produce a plurality of cut out areas defining a plurality of spaced apart transversely extending stripshaped pieces each of which is connected to adjacent stripshaped pieces by connecting portions located adjacent each edge of the band, weakening predetermined opposed pairs of the connecting portions so as to define a plurality of core pieces comprised of at least two strip-shaped pieces joined together by at least two unweakened connecting portions located on opposite edges of said core piece, covering said core member with a covering material to form a composite band structure;

breaking the weakened connecting portions thereby separating the core pieces, and bending the composite band structure to provide said channel-shaped trim.

2. The method of producing a channel-shaped trim according to claim 1, wherein the width of each of said weakened connecting portions are smaller than the width of each of said connecting portions in said core pieces so that said weakened connecting portions are easily broken.

3. The method of producing a channel-shaped trim according to claim 1, wherein:

during slotting, transversely extending slots are formed which are longitudinally spaced from each other and are defined between unslotted connecting portions along both side edges of said band of material and wherein the step of weakening includes forming transversely extending grooves across the predetermined opposed pairs of the unslotted connecting portions.

4. The method as in claim 1 wherein the band material is metal.

5. The method as in claim 1 wherein the material is sheet metal.

6. A method for producing channel-shaped trim having a longitudinally extending opening for embracing and clamping an edge flange of a support member comprising the steps of forming a core member for said trim by slotting a band of material to produce a plurality of cut out areas defining a plurality of spaced apart transversely extending strip-shaped pieces each of which is connected to adjacent strip-shaped pieces by connecting portions located adjacent each edge of the band, weakening alternating opposed pairs of the connecting portions so as to define a plurality of core pieces comprised of a pair of strip-shaped pieces joined together by a pair of unweakened connecting portions located on opposite edges of said core piece, covering said core member with a covering material to form a composite band structure, breaking the weakened connecting portions thereby separating the core pieces, and bending the composite band structure to produce said channel-shaped trim.

* * * * *